US006158459A

United States Patent [19]
Chang

[11] Patent Number: 6,158,459
[45] Date of Patent: Dec. 12, 2000

[54] OIL NOZZLE STRUCTURE FOR PNEUMATIC TOOLS

[76] Inventor: An-Mei Chang, 7F-10, No. 143, Bo-An Six Street, Tachung City, Taiwan

[21] Appl. No.: 09/542,836

[22] Filed: Apr. 4, 2000

[51] Int. Cl.[7] .................... F16K 37/00

[52] U.S. Cl. .................... 137/559; 73/323; 116/276; 285/93; 81/489

[58] Field of Search .................... 137/559; 73/323; 116/276; 285/93; 81/489

[56] References Cited

U.S. PATENT DOCUMENTS

| | | | |
|---|---|---|---|
| 3,857,277 | 12/1974 | Moore | 137/559 X |
| 4,945,948 | 8/1990 | Fischer et al. | 137/559 |
| 5,579,803 | 12/1996 | Welker et al. | 137/559 X |
| 6,062,606 | 5/2000 | Carpini et al. | 285/93 X |

FOREIGN PATENT DOCUMENTS

| | | | |
|---|---|---|---|
| 1418245 | 12/1975 | United Kingdom | 137/559 |

*Primary Examiner*—Kevin Lee
*Attorney, Agent, or Firm*—Rosenberg, Klein & Lee

[57] ABSTRACT

An oil nozzle structure for pneumatic tools is provided and mainly characterized in that an oil nozzle is directly mounted into a receiving space provided at an outer end of a handle portion of a pneumatic tool, and that a clear inspection window and a through oil port are provided on a wall of the handle portion of the pneumatic tool corresponding to the receiving space, such that oil may be directly supplied into the receiving space via the oil port and penetrate into the oil nozzle before being sent into the pneumatic tool by supplied air to lubricate internal components of the tool, and that oil level in the receiving space may be conveniently observed via the clear inspection window to timely replenish the receiving space with oil.

1 Claim, 4 Drawing Sheets

OIL NOZZLE STRUCTURE FOR PNEUMATIC TOOLS

BACKGROUND OF THE INVENTION

FIG. 1 shows a commercially available pneumatic tool A that is provided at a bottom end with an inlet hole A1, to which an oil nozzle A2 is connected in such a manner that the oil nozzle A2 is located outside the pneumatic tool A to project from the bottom end of the tool. The oil nozzle A2 defines an axially extended air passage A3 and an oil storage space A4 therein. When the pneumatic tool A is switched on to operate, oil in the storage space A4 moves into the tool A via the air passage A3, and thereby keeps an interior of the pneumatic tool A in a lubricated state.

The above-described conventional oil nozzle A2 is externally connected to and projects from the inlet hole A1 of the pneumatic tool A. When an air hose A5 is connected to the projected oil nozzle A2 for supplying air and thereby bringing the oil into the pneumatic tool A, the oil nozzle A2 and the air hose A5, on the other hand, together form a hindrance to an user who is handling the tool. Moreover, it is troublesome to connect and disconnect the oil nozzle A2 to and from the inlet hole A1 each time and the oil nozzle A2 would possibly be carelessly lost during such connection and disconnection of the oil nozzle to the pneumatic tool A. Furthermore, oil stored in the oil nozzle A2 tends to overspill from the oil storage space A4 when the oil nozzle A2 is repeatedly connected and disconnected to and from the inlet hole A1. Therefore, frequent replenishment of oil into the oil nozzle A2 is required that also brings troubles to the user.

SUMMARY OF THE INVENTION

It is therefore a primary object of the present invention to provide an oil nozzle structure for pneumatic tools that would not hinder the operation of the pneumatic tool by the user during working and enables convenient observation of oil amount available for supplying to the oil nozzle to lubricate the pneumatic tool.

To achieve the above and other objects, the oil nozzle structure for pneumatic tools according to the present invention includes an inlet hole provided at an outer end of a handle portion of a pneumatic tool to define a receiving space in the inlet hole, a clear inspection window provided at an area on a wall of the handle portion corresponding to the receiving space in the handle portion, a through oil port provided on the same wall of the handle portion to one side of the inspection window, and an oil nozzle screwed into the inlet hole to locate in the receiving space. The oil nozzle defines a through air passage therein and has an adjusting member set on a wall of the oil nozzle at a predetermined position, and seal rings are mounted around front and rear ends of the oil nozzle to ensure tight and sealed contact of the oil nozzle with inner walls of the receiving space. With these arrangement, oil may be directly supplied into the receiving space via the oil port and then penetrate into the air passage via the adjusting member before the oil is brought into the pneumatic tool from the air passage via the inlet hole by an amount of air supplied into the air passage, and an oil level in the receiving space may be observed via the clear inspection window at any time to timely replenish the receiving space with oil via the oil port.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
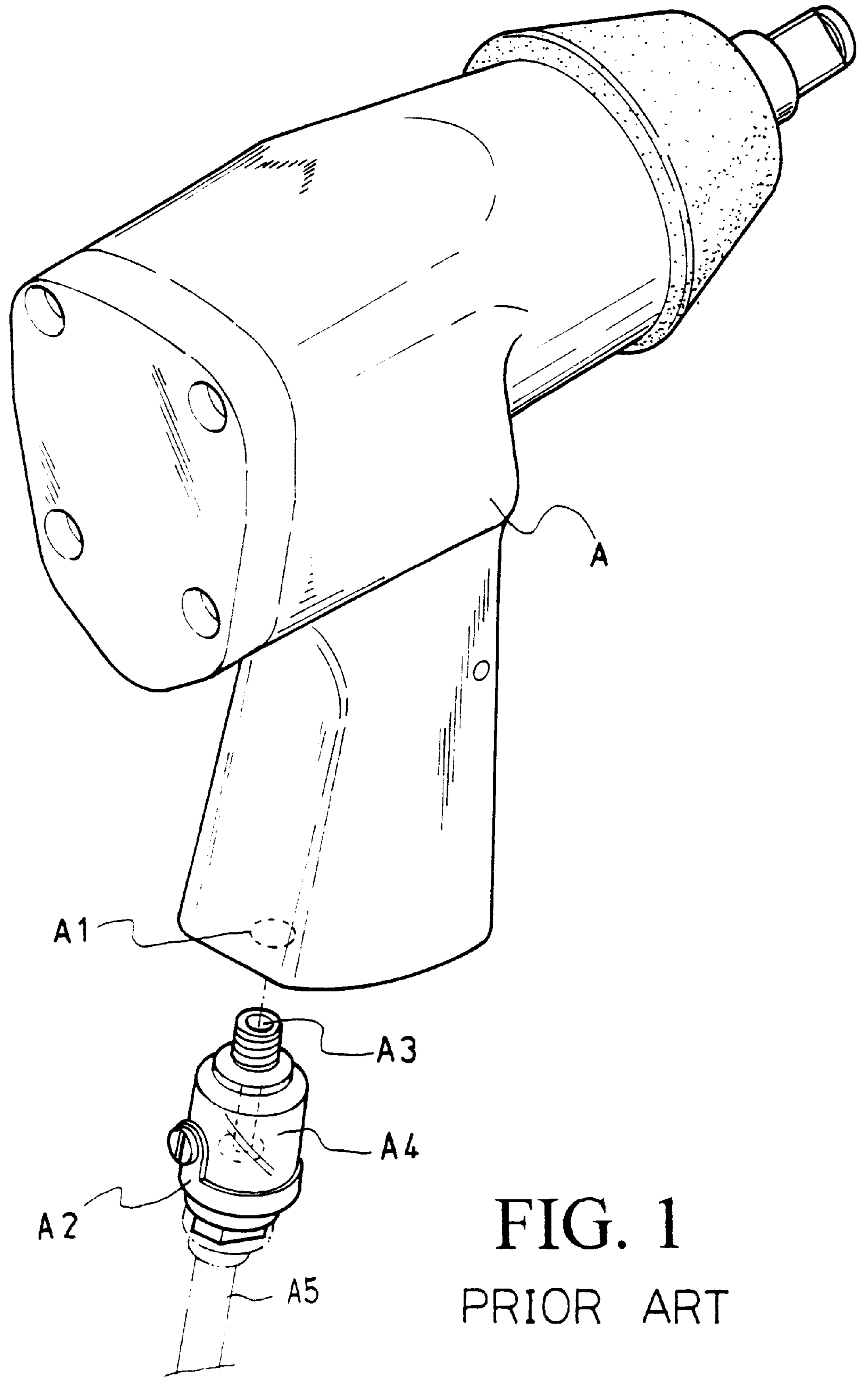
FIG. 1 PRIOR ART
FIG. 1 shows a pneumatic tool with a conventional oil nozzle structure.
Figure 2:
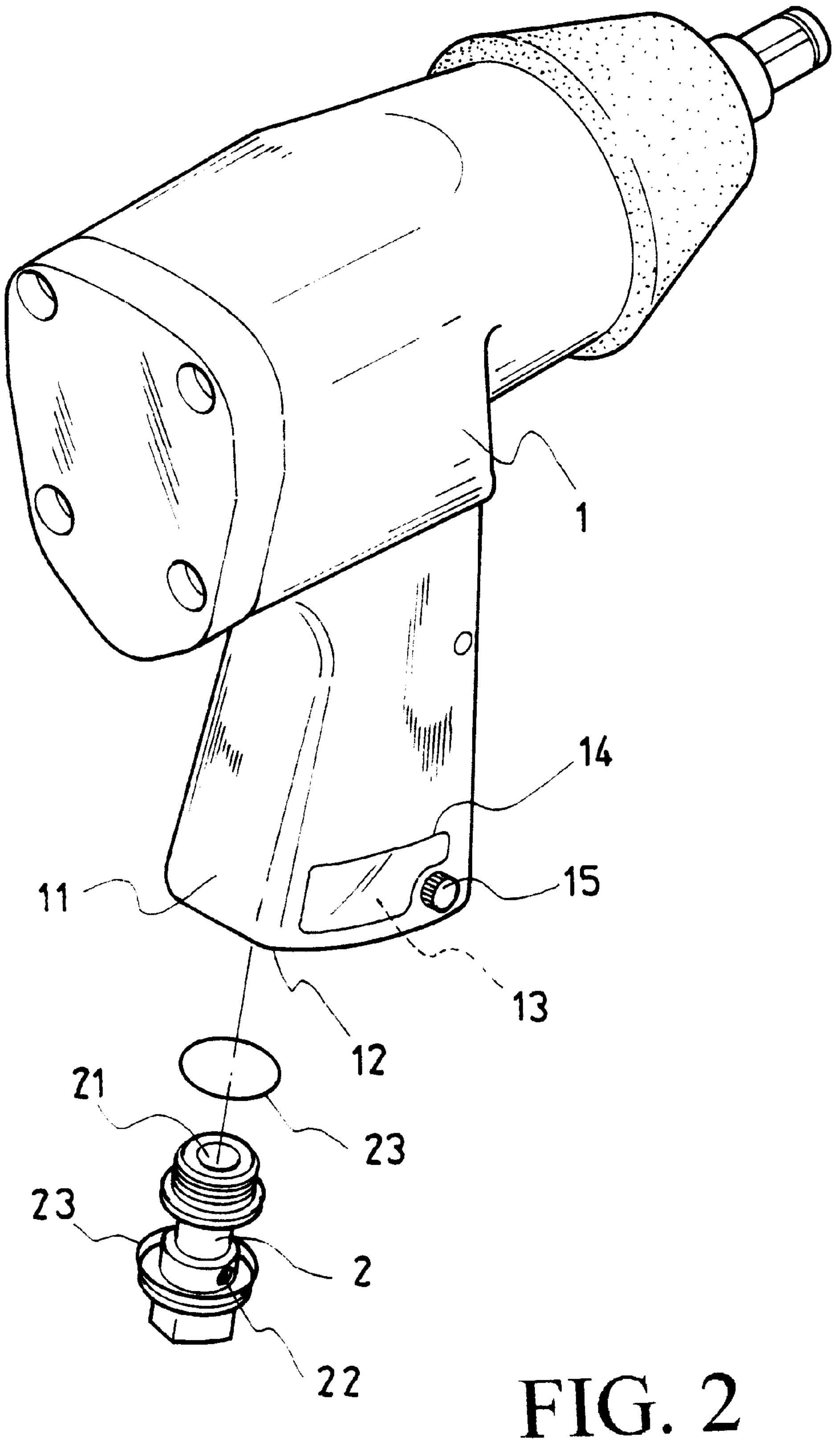
FIG. 2 is an exploded perspective of an oil nozzle structure for a pneumatic tool according to an embodiment of the present invention.
Figure 3:
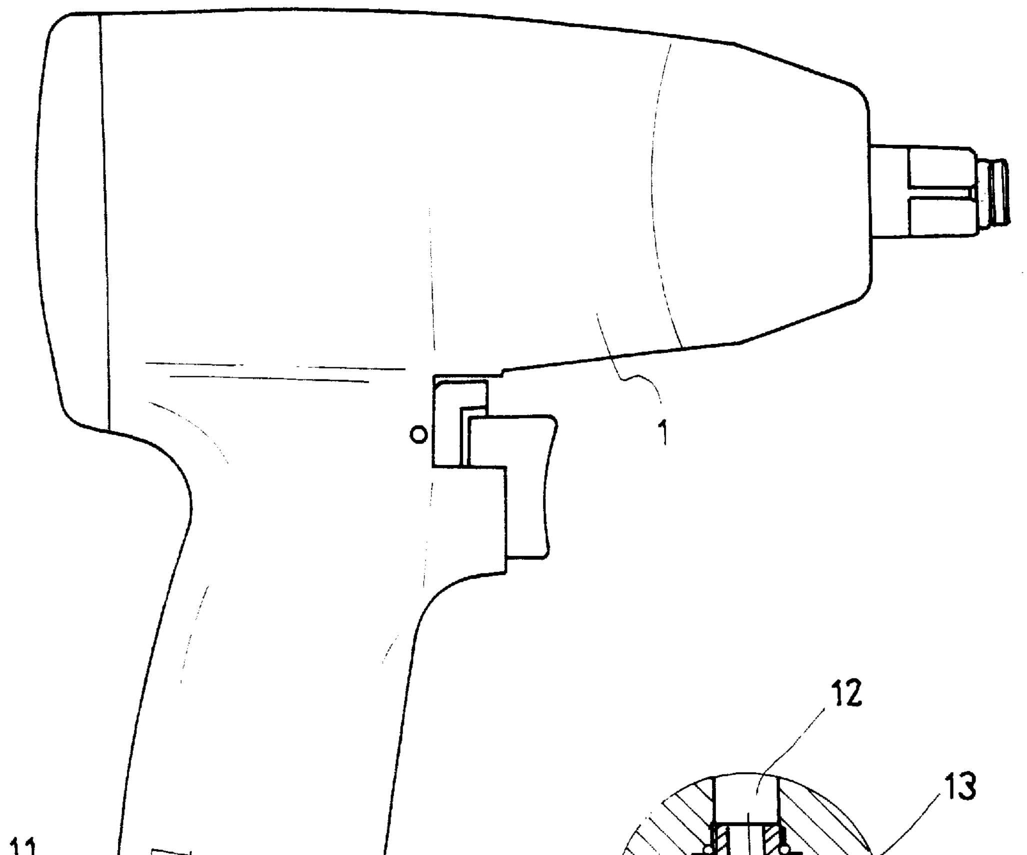
FIG. 3 is a schematic side view of the oil nozzle structure for a pneumatic tool of FIG. 2 in an assembled state.

The present invention relates to an oil nozzle structure for pneumatic tools. Please refer to FIGS. 2, 3 and 3A for details of this structure. As shown in the drawings, a pneumatic tool 1 has a handle portion 11 in which an inlet hole 12 is provided to define a receiving space 13 at an outer end portion of the inlet hole 12. An area on a wall of the handle portion 11 corresponding to one side of the receiving space 13 is formed of a clear inspection window 14 and a through oil port 15. Oil may be supplied into the receiving space 13 via the oil port 15 and oil level in the receiving space 13 may be observed via the clear inspection window 14.

Figure 3A:
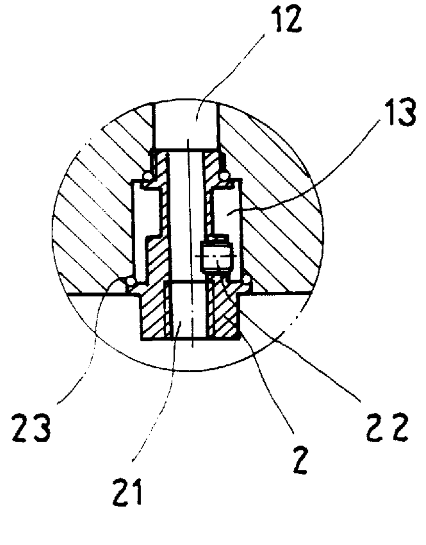
FIG. 3A is an enlarged sectional view of the circled portion in FIG. 3 to show the relative position of an oil nozzle in the pneumatic tool.

The receiving space 13 is designed to receive an oil nozzle 2 therein as can be clearly seen from FIG. 3A. The oil nozzle 2 itself defines a through air passage 21 therein with an adjusting member 22 movably fixed to a predetermined point on a wall of the oil nozzle 2 to partially project into the air passage 21. Seal rings 23 are mounted onto front and rear ends of the oil nozzle 2 to ensure tight and sealed contact of the oil nozzle 2 with inner walls of the receiving-space 13.

The oil nozzle 2 may be securely located in the receiving space 13 at the outer end of the handle portion 11 of the pneumatic tool 1 by, for example, providing threads around the inner walls of the receiving space 13 for the oil nozzle 2 to screw thereinto. When the oil nozzle 2 has been screwed into the receiving space 13, a space is left between the inner walls of the receiving space 13 and a diameter-reduced belly portion of the oil nozzle 2 to accommodate proper amount of oil directly supplied into the receiving space 13 via the oil port 15. Oil level in the receiving space 13 can be observed from outside of the inspection window 14. Oil supplied into the receiving space 13 penetrates into the oil passage 21 of the oil nozzle 2 via the adjusting member 22. By adjusting the location of the adjusting member 22 relative to the wall of the oil nozzle 2, a magnitude of penetration of oil from the receiving space 13 into the oil passage 21 can be controlled.

An air hose A5 is connected to an outer end of the oil nozzle 2 to supply an amount of air into the pneumatic tool 1 via the oil nozzle 2 and the inlet hole 12 on the handle portion 11 of the tool 1.

When the pneumatic tool 1 is switched on to operate, oil penetrated from the receiving space 13 into the oil passage 21 via the adjusting member 22 is brought into the pneumatic tool 1 by the air supplied from the air hose A5 into the oil passage 21, and thereby lubricates components inside the pneumatic tool 1. With these arrangements, the pneumatic tool 1 is given good mobility during operation at any time.

An important advantage of the present invention is that the oil in the receiving space 13 may be readily observed via the inspection window 14 and replenished via the oil port 15 when the pneumatic tool 1 has been used for a period of time. Another advantage of the present invention is that the mounting of the oil nozzle 2 in the handle portion 11 of the tool 1 frees the tool 1 from the problems of inconvenient handling of the tool and missing oil nozzle or overspilt oil from the oil nozzle otherwise possibly occurred in repeated mounting and dismounting of the oil nozzle to and from the pneumatic tool.

Figure 4:
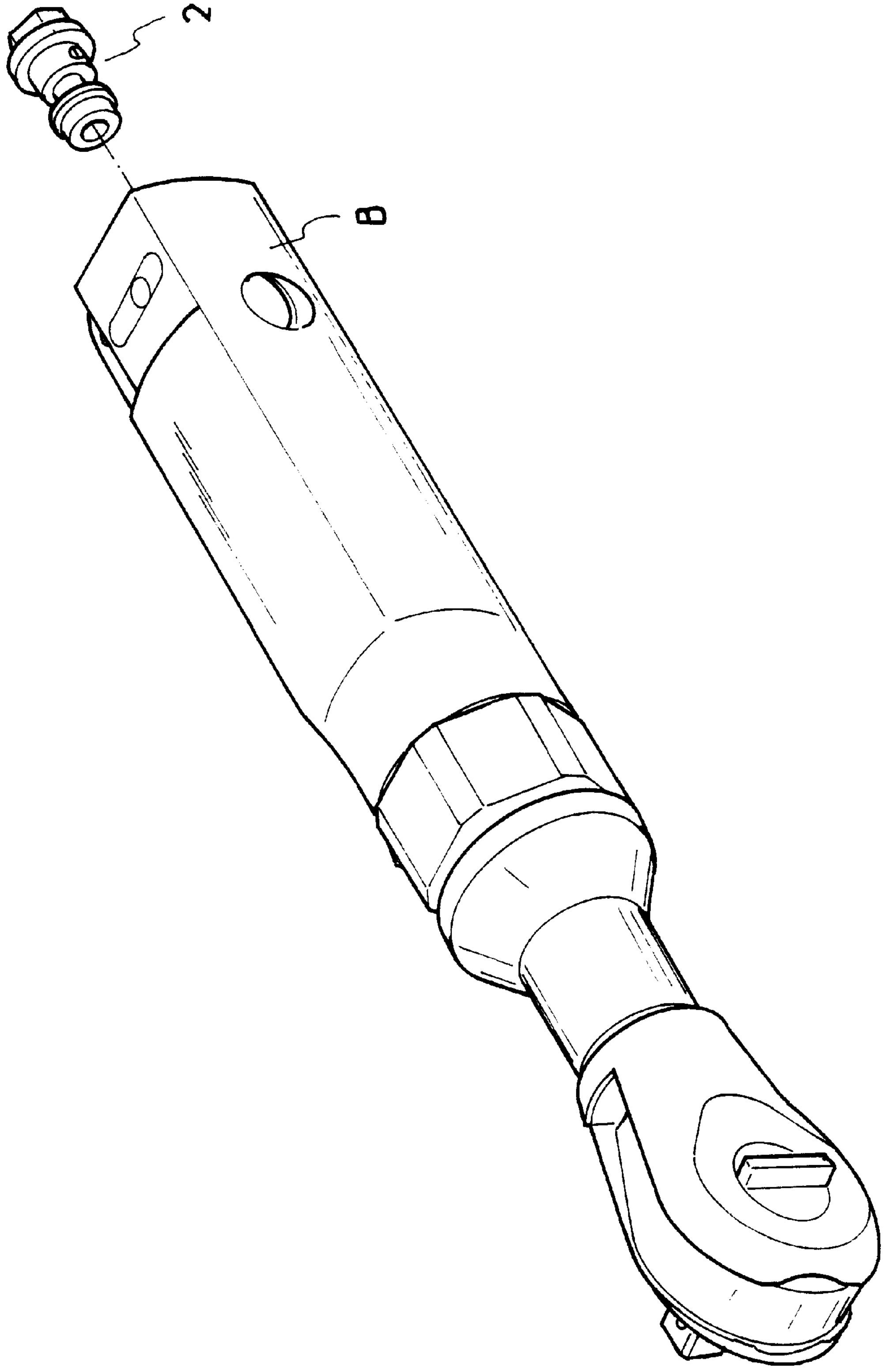
FIG. 4 shows the present invention being used on another type of pneumatic tool.

FIG. 4 illustrates a differently shaped pneumatic tool B that can also be provided at an outer end with the oil nozzle structure of the present invention to receive an oil nozzle 2 in the outer end thereof. This means the oil nozzle structure of the present invention may be widely incorporated with any type of pneumatic tools without any restriction.

The oil nozzle structure of the present invention may be directly associated with a pneumatic tool to give the latter a largely simplified structure and reduced manufacturing cost, and is therefore very practical for use.

What is claimed is:

1. An oil nozzle structure for pneumatic tools, comprising an inlet hole provided at an outer end of a handle portion of a pneumatic tool to define a receiving space in said inlet hole, a clear inspection window provided at an area on a wall of said handle portion corresponding to said receiving space in said handle portion, a through oil port provided on the same wall of said handle portion to one side of said inspection window, and an oil nozzle fastened into said inlet hole to locate in said receiving space; said oil nozzle defining a through air passage therein and having an adjusting member set on a wall of said oil nozzle at a predetermined position, and seal rings being mounted around front and rear ends of said oil nozzle to ensure tight and sealed contact of said oil nozzle with inner walls of said receiving space; whereby oil may be directly supplied into said pneumatic tool via said oil port and then penetrate into said air passage via said adjusting member before the oil is brought into said pneumatic tool from said air passage via said inlet hole by an amount of air supplied into said air passage, and an oil level in said receiving space may be observed via said clear inspection window and timely replenished via said oil port.

* * * * *